(12) United States Patent  
Zeltwanger et al.

(10) Patent No.: US 7,527,142 B1  
(45) Date of Patent: May 5, 2009

(54) BELT CONVEYOR WING PULLEY

(75) Inventors: Micah D. Zeltwanger, Morris, MN (US); James M. Solvie, Morris, MN (US)

(73) Assignee: Superior Industries, L.L.C., Morris, MN (US)

( * ) Notice: Subject to any disclaimer, the term of this patent is extended or adjusted under 35 U.S.C. 154(b) by 0 days.

(21) Appl. No.: 11/980,874

(22) Filed: Oct. 31, 2007

(51) Int. Cl.  
*B65G 39/10* (2006.01)  
*B65G 45/10* (2006.01)

(52) U.S. Cl. .................. 198/494; 198/835; 198/842

(58) Field of Classification Search ............. 198/494, 198/834–835, 842  
See application file for complete search history.

(56) References Cited

U.S. PATENT DOCUMENTS

| | | | | |
|---|---|---|---|---|
| 1,335,421 A | * | 3/1920 | Black | 198/842 |
| 1,980,777 A | * | 11/1934 | Zollinger | 198/829 |
| 3,038,590 A | * | 6/1962 | Arndt | 198/842 |
| 3,046,805 A | | 7/1962 | Van Gorp | |
| 3,055,229 A | | 9/1962 | Mecham | |
| 3,354,735 A | | 11/1967 | Holz | |
| 4,180,155 A | | 12/1979 | Stevick | |
| 4,233,853 A | | 11/1980 | Holz | |
| 4,284,409 A | | 8/1981 | Van Teslaar | |
| 4,643,294 A | * | 2/1987 | Whited | 198/498 |
| 4,718,544 A | | 1/1988 | Herren | |
| 4,984,363 A | | 1/1991 | Valster et al. | |
| 5,109,976 A | * | 5/1992 | Mohri et al. | 198/498 |
| 5,190,146 A | * | 3/1993 | Valster et al. | 198/843 |
| 5,209,704 A | * | 5/1993 | Valster et al. | 474/185 |
| 6,938,754 B2 | | 9/2005 | Kanaris | |
| 7,070,042 B2 | * | 7/2006 | Dow et al. | 198/835 |

OTHER PUBLICATIONS

CEMA Standard 501.1, Specifications for "Welded Steel Wing Pulleys", Conveyor Equipment Manufacturers Association, ANSI/CEMA 501.1-2003 (Revision of ANSI/CEMA 501.1-1988) (5 pgs.).

* cited by examiner

*Primary Examiner*—Mark A Deuble  
(74) *Attorney, Agent, or Firm*—Dicke, Billig & Czaja, PLLC

(57) ABSTRACT

A belt conveyor wing pulley is comprised of a plurality of V-shaped wings radially spaced about and connected to circumferential surfaces of a pair of spaced hubs. Gussets are connected to facing surfaces of adjacent wings and to the circumferential surfaces of the hubs.

25 Claims, 8 Drawing Sheets

BELT CONVEYOR WING PULLEY

BACKGROUND

The present invention is directed to belt conveyor pulleys and in particular to wing-type pulleys. Wing pulleys are known for supporting an endless belt of a conveyor at the feed end of the conveyor, where material such as sand, gravel, or the like is deposited on the conveyor belt. Wing pulleys comprise separate radially spaced plates emanating from a central hub that define separate contact surfaces on the pulley. The contact surfaces of a wing pulley beat the underside of the conveyor belt to remove debris and direct it as well as any other material away from the pulley to prevent wear and/or damage to the conveyor belt. There is a need to improve the effectiveness of a wing pulley in expelling debris from the belt.

SUMMARY

The present invention is directed to a wing pulley for a belt conveyor. The pulley has a length for supporting a conveyor belt along its width. The pulley comprises spaced first and second hubs aligned along a common axis. Each of the first and second hubs has a circumferential surface. Radially spaced about and connected to the circumferential surfaces of the first and second hubs are a plurality of wings. Each wing of the plurality of wings is configured to define a contact surface radially spaced from the first and second hubs for contacting the conveyor belt. The contact surface of a first wing of the plurality of wings is configured to overlap with the contact surface of a second wing of the plurality of wings along the length of the pulley such that the width of the conveyor belt is supported by the first and second wings. A gusset is connected between a first surface of each wing and a second surface of an adjacent wing.

DETAILED DESCRIPTION

Figure 1:
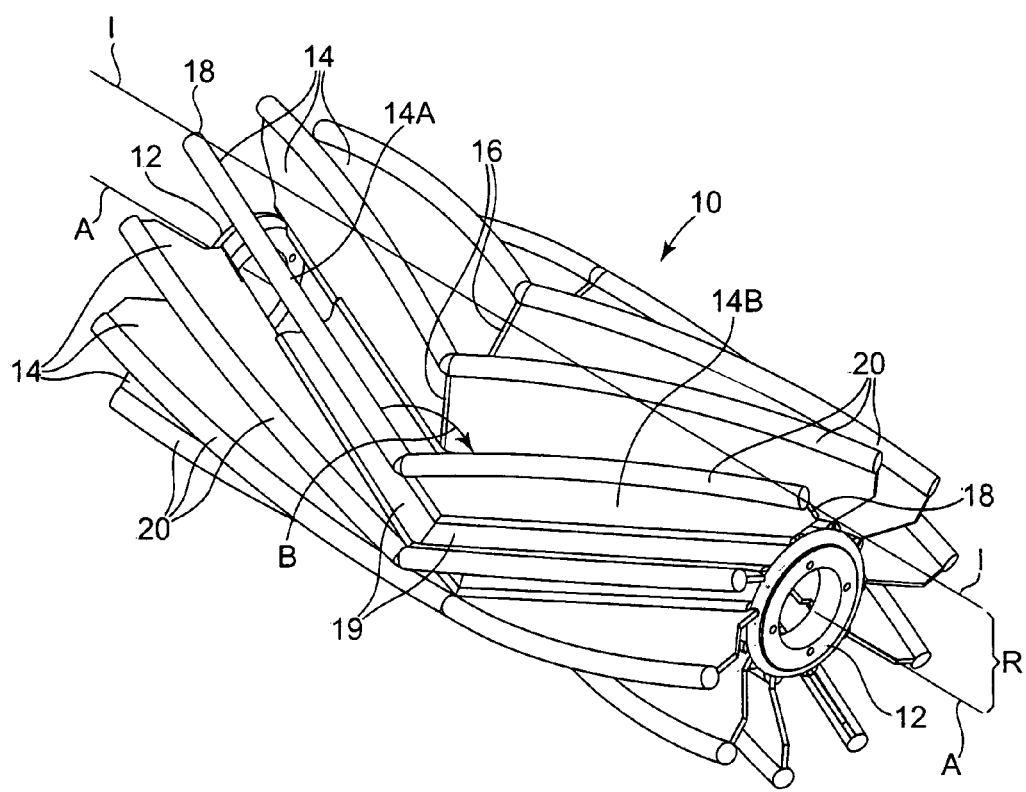
FIG. 1 is a perspective view of a first embodiment of a wing pulley of the present invention.

FIG. 1 is a perspective view of a first embodiment of a wing pulley 10 of the present invention. Wing pulley 10 includes a pair of spaced hubs 12 having a common center axis A and a plurality of wings 14 that are generally equally radially spaced about hubs 12 and secured thereto. In one exemplary embodiment, each wing 14 is formed at an angle such that wing 14 includes first and second wing portions 14A and 14B. In one preferred embodiment, wing portions 14A and 14B define an angle B of about 137 degrees. In one embodiment, each wing 14 includes a contact surface 20 defined by a round metal bar secured along an upper edge of wing 14, which engages and supports a conveyor belt. Wing portions 14A, 14B define a wing apex 16 at an approximate midpoint of wing 14 relative to wing ends 18. Relative to the direction of rotation of wing pulley 10, apex 16 is oriented forward of an imaginary line I that extends between ends 18 along the contact surface 20 and is generally parallel with the center axis A of wing pulley 10. Connected between adjacent wings 14 are metal gussets 19, which extend from hubs 12 to apex 16. Gussets 19 are secured to wings 14 and hubs 12 by welding. Hubs 12 have a central opening for receiving a bushing and shaft for rotationally mounting wing pulley 10 at the feed end of a conveyor.

Figure 2:
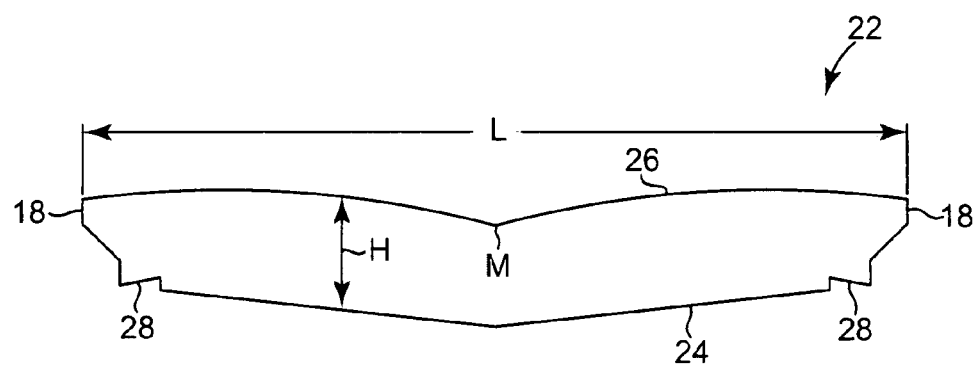
FIG. 2 is a front plan view of a wing plate of the wing pulley of FIG. 1.

FIG. 2 is a front plan view of a wing plate 22 which forms each wing 14 of wing pulley 10. Wing plate 22 includes a lower edge 24 and an upper edge 26, which extend between opposing ends 18. The lower edge 24 and the upper edge 26 define a height H of wing plate 22. In one embodiment, lower edge 24 is configured with a notch 28 adjacent to ends 18 for connection of wing plate 22 to each hub 12. Upper edge 26 defines the length L of wing plate 22, which is greater than the length of lower edge 24. Upper edge 26 travels in an arc from midpoint M of wing plate 22 to each end 18, such that wing plate 22 has bi-lateral symmetry relative to midpoint M. The radius of curvature of upper edge 26 is selected to define a radius R of wing 14 as measured from axis A (FIG. 1) that is generally the same at all points along the length L of upper edge 26 and contact surface 20 (not shown). The radius of curvature of upper edge 26 will vary according to the particular length and radius selected for wing pulley 10 and may be calculated using any suitable mechanical design software. Wing plate 22 is formed by cutting a plate of steel having a thickness of between about $3/16$ inch to about $5/16$ inch, such as with a plasma cutter. In one embodiment, wing plate 22 has a length of about 40.50 inches and a midpoint of about 20.25 inches.

Figure 3:
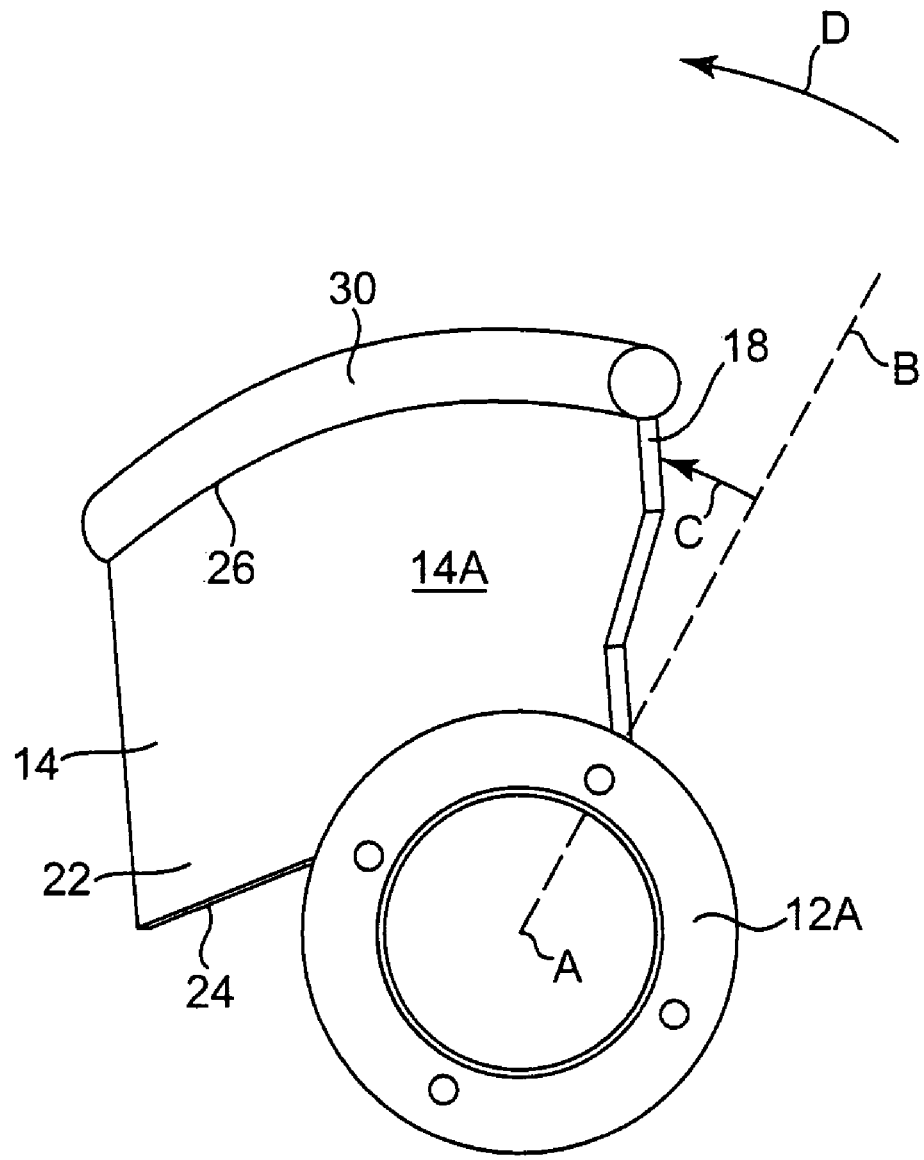
FIG. 3 is an end view of a hub and one wing of the wing pulley of FIG. 1.

FIG. 3 is an end view of hub 12 and one wing 14 representative of the orientation of each wing 14 relative to hub 12. As shown in FIG. 3, in one embodiment, lower edge 24 of wing portion 14A is positioned on a radial B of axis A of hub 12A at end 18 of wing 14. Wing portion 14B is similarly positioned relative to the opposite hub. Each wing 14 is set at an angle C such that each wing portion 14A, 14B lies in a plane that is between about 0 degrees and 30 degrees forward of radial B in the direction of intended rotation of wing pulley 10, as indicated by arrow D. In one preferred embodiment, each wing portion 14A, 14B is set at an angle of about 30 degrees relative to radial B. As further shown in FIG. 3, attached to upper edge 26 of wing plate 22 is a metal contact bar 30, which in the embodiment shown has a generally circular cross section. In one exemplary embodiment, contact bar 30 has a diameter of about 0.984 inches. Other shapes and dimensions of contact bar 30 may be employed with the present invention.

Figure 4:
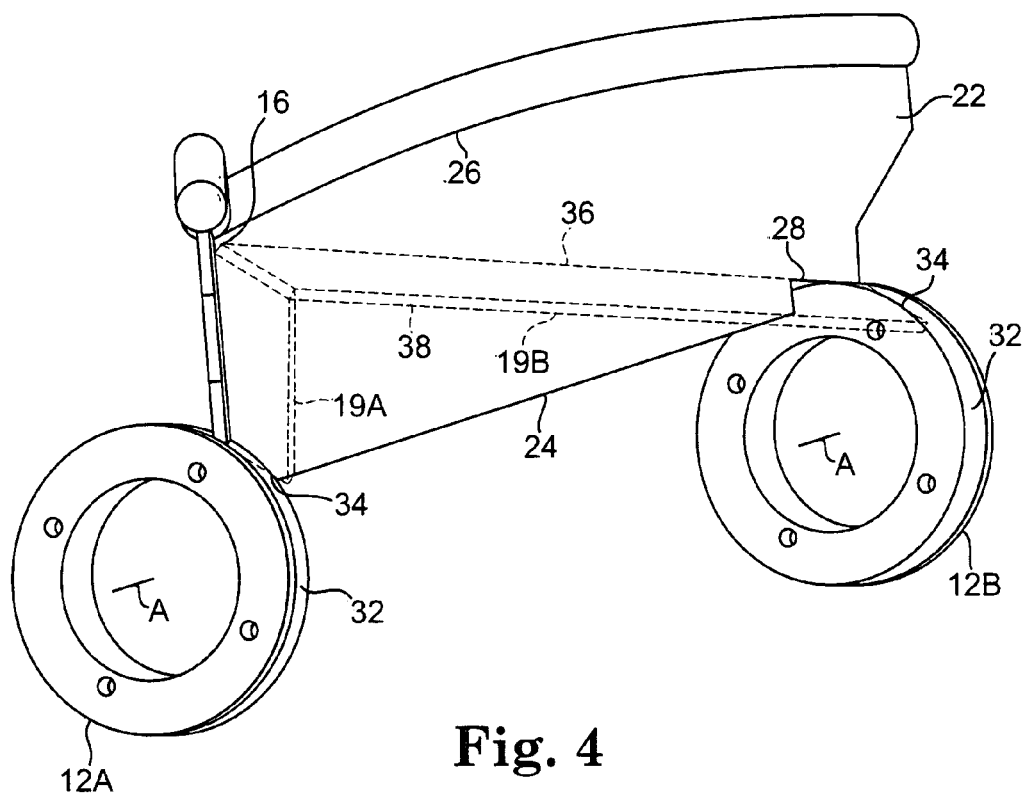
FIG. 4 is a rear perspective view of the hung and wing of FIG. 3.

FIG. 4 is a rear perspective view of the hub and wing shown in FIG. 3. As shown in FIG. 4, each hub 12A, 12B is provided with a stepped circumferential outer surface 32, with the inward facing portions of hubs 12A, 12B having a slightly smaller outer diameter than the adjacent outward facing portion of hubs 12A, 12B. The notch 28 of each wing portion 14A, 14B includes a lower edge which lies at an angle relative to lower edge 24 of wing plate 22. The angle of the lower edge of notch 28 is selected to maximize the lower edge contact of wing plate 22 with the outer surface 32 of hubs 12A, 12B. Wing plate 22 is connected to hubs 12A, 12B by welding along the lower edge of notch 28 on opposite sides of wing plate 22.

Adjacent wings 14 are connected together via gussets 19, which are shown in phantom in FIG. 4. Each gusset 19 is comprised of two elongated metal plates 19A, 19B that extend from hubs 12 to apex 16 and is configured to contact the facing surfaces of adjacent wing plates. Each end 34 of gusset plates 19A, 19B are secured to the hub outer surface 32 by welding. Plates 19A, 19B are secured to one wing plate 22 along edge 36 by welding, while the adjacent wing plate (not shown) is secured to edge 38 by welding. Plates 19A and 19B are also welded together at the interface of the two plates at the apex 16. Plates 19A, 19B extend from the lower edge of notch 28 and hubs 12 at an angle toward the upper edge 26 of wing plate 22, which results in each gusset 19 having a radius at the apex 16 of wing 14 relative to hub axes A that is greater than the radius of ends 34 of gusset 19. Gussets 19 thus slope away from the midpoint of wings 14 to the hubs 12, which aids in the ability of wing pulley 10 to direct debris in a direction towards hubs 12.

Figure 5:
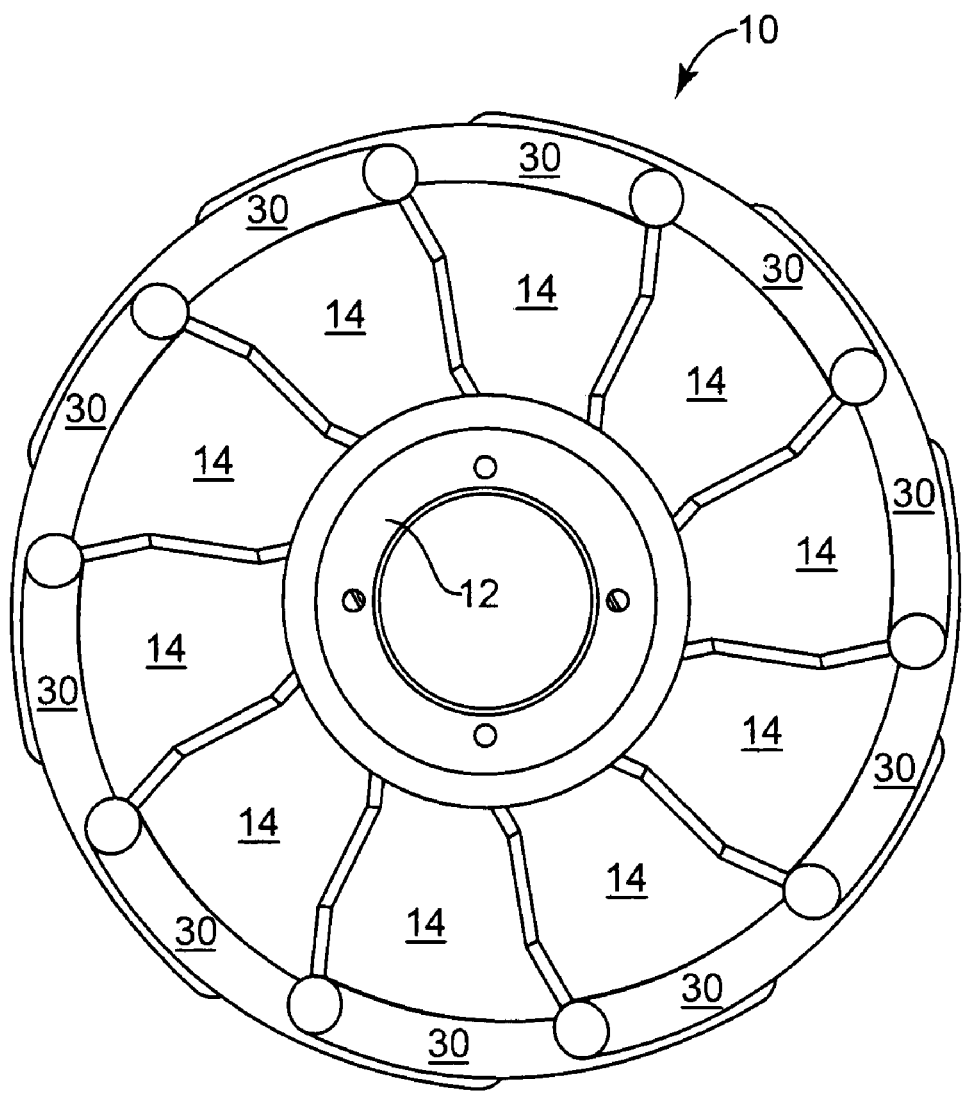
FIG. 5 is an end elevational view of the wing pulley of FIG. 1.

FIG. 5 is an end view of wing pulley 10 of FIG. 1. As shown in FIG. 5, in one embodiment, wing pulley 10 is comprised of ten generally equally radially spaced wings 14, each of which is mounted to hubs 12 in the manner previously described. Collectively, the metal contact bars 30 define a generally cylindrical contact surface of wing pulley 10 for supporting a conveyor belt. As shown in FIG. 5, the contact bar 30 of each wing 14 substantially overlaps the contact bar 30 of an adjacent wing 14. As a result, a conveyor belt is able to be substantially supported along the length of wing pulley 10 by at least two wings 14. The overlap of contact bars 30 of adjacent wings 14 provides a smooth transition for belt contact from one contact bar to the next adjacent contact bar, which minimizes the amount of vibration transmitted to the conveyor belt and decreases the rate of wear on the belt.

Figure 6:
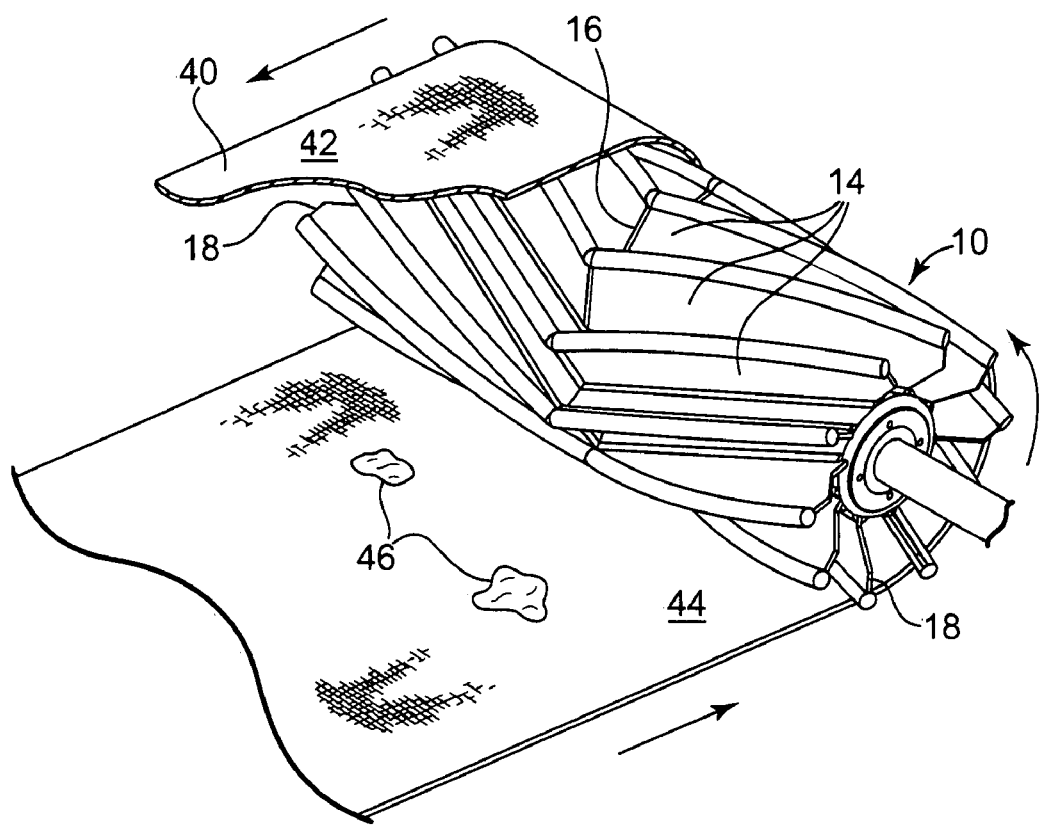
FIG. 6 is a diagrammatic perspective view of the wing pulley of FIG. 1 engaging a conveyor belt.

FIG. 6 is a diagrammatic perspective view of wing pulley 10 shown engaging a conveyor belt 40 at the feed end of a conveyor. The upper belt surface 42 is shown traveling away from wing pulley 10, while the lower belt surface 44 is shown traveling toward wing pulley 10, with wing pulley 10 rotating counterclockwise. Material deposited on the upper belt surface 42 invariably results in some material migrating to the lower belt surface 44 facing wing pulley 10. Material 46 that falls on the lower belt surface 44 is carried to wing pulley 10 until it engages wings 14. The angular shape of wings 14 relative to apex 16 and the rotation of wing pulley 10 result in the material 46 being quickly and efficiently directed laterally toward ends 18 of wings 14 and away from wing pulley 10. The V-shaped configuration of wings 14 further aid in keeping belt 40 centered on wing pulley 10.

Figure 7:
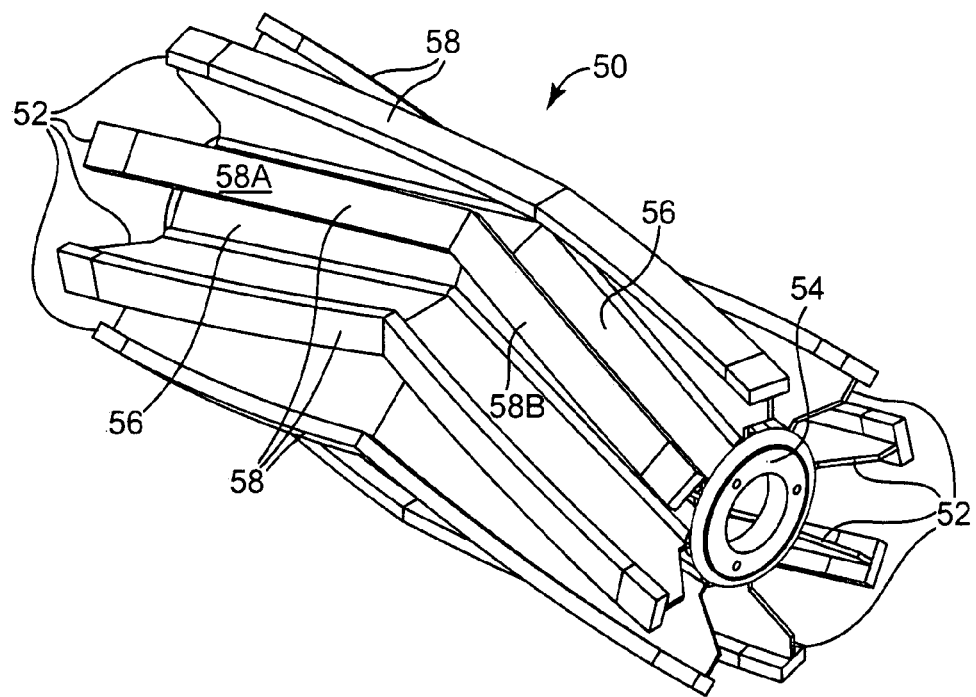
FIG. 7 is a perspective view of a second embodiment of a wing pulley of the present invention.
Figure 8:
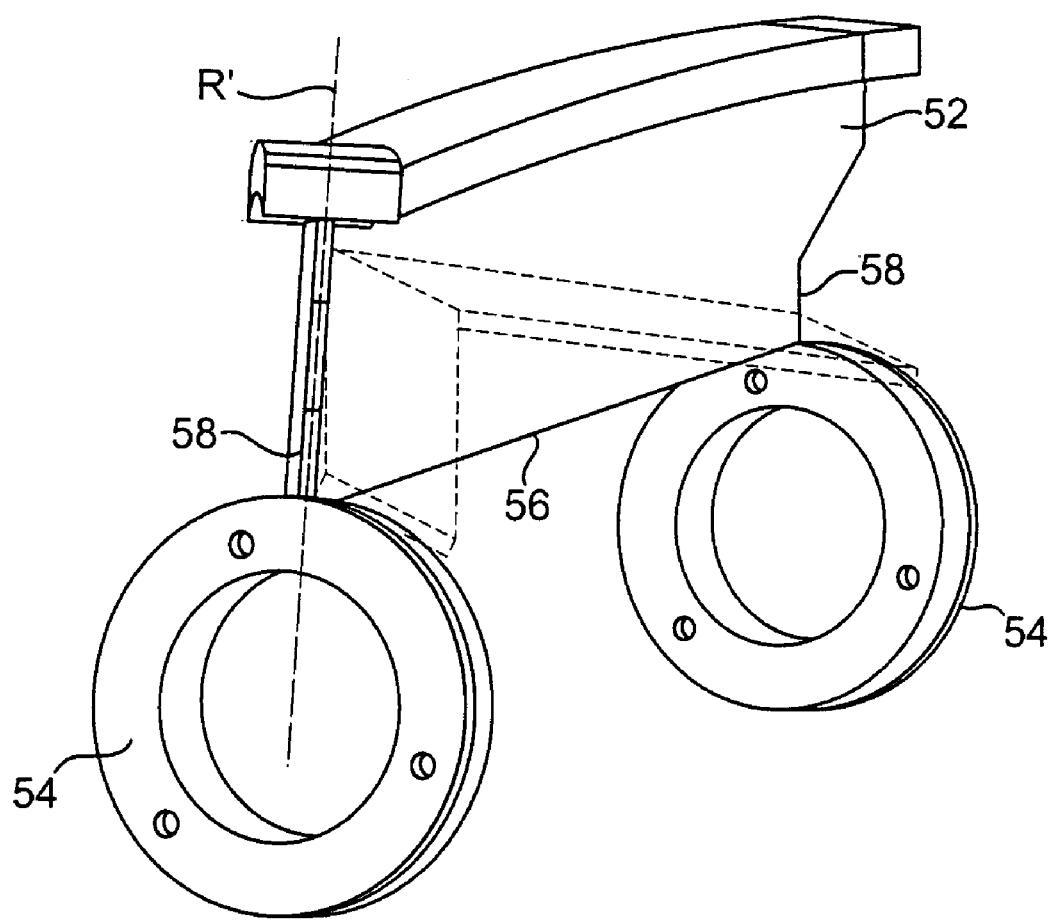
FIG. 8 is a perspective view of the right end of the wing pulley of FIG. 7.

FIG. 7 is a front perspective view of a second embodiment of the present invention. FIG. 7 shows a wing pulley 50 having eight generally equally radially spaced wings 52, each of which is formed in a V-shape substantially as described relative to wings 14 of the first embodiment (FIG. 1). Each wing 52 is secured to hubs 54 by welding in the manner previously described. Also adjacent wings 52 are connected to gussets 56 by welding in the manner previously described. Wing pulley 50 differs from wing pulley 10 in that contact bars 58 are formed from metal bars 58A, 58B having a rectangular cross-sectional shape. Metal bars 58A, 58B have mitered ends that abut one another and are welded together to conform to the angle of wings 52. As a result of wing pulley 50 having eight wings, there is less overlap between the contact bars 58 of adjacent wings 52, yet wings 52 provide sufficient belt support. As shown in FIG. 8, which is an end perspective view of one wing 52 mounted to hubs 54, each wing 52 is oriented on a radial R' in a plane that is substantially parallel to radial R'. Unlike wings 14 of wing pulley 10, the lower edge 56 of wings 52 of wing pulley 50 lack a notch at the ends 58 of wings 52.

The V-shaped wing configuration of the wing pulley of the present invention deflects material away from the wing pulley and conveyor belt more efficiently and effectively than standard wing pulleys. As a result, material is less apt to get wedged between adjacent wings and the conveyor belt and belt damage is minimized. The V-shaped wing configuration also results in wing overlap along the length of the wing pulley to permit a conveyor belt to be supported by multiple wings along the belt width and ease the transition of belt contact from one wing to the next. This in turn minimizes vibration to the belt, extends belt life and reduces the amount of noise generated from the wings contacting the belt.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A pulley for a conveyor belt comprising:
    spaced first and second hubs aligned along a common axis, each of the first and second hubs having a circumferential surface;
    a plurality of radially spaced wings connected to the circumferential surface of the first and second hubs, each wing comprising:
        a metal plate having a length defined by a first end and a second end opposite the first end, a width defined by first and second surfaces of the plate, and a height defined by a first edge and a second edge opposite the first edge, the plate configured to define a first plate portion and a second plate portion, the first and second plate portions extending at an angle relative to one another from a location generally midway between the first and second end of the plate, each metal plate having an end portion near the first and second end that is connected to the circumferential surface of the first and second hubs; and
    a gusset connected between the first surface of each plate and the second surface of an adjacent plate.

2. The pulley of claim 1 wherein the front and rear surfaces of the first and second plate portions are generally parallel to a radially extending line from each hub circumferential surface corresponding to each wing connection to the first and second hubs.

3. The pulley of claim 1 wherein the front and rear surfaces of the first and second plate portions extend at an angle of between about zero degrees to about 30 degrees in a direction of intended rotation of the pulley relative to a radially extending line from each hub circumferential surface corresponding to each wing connection to the first and second hubs.

4. The pulley of claim 1 wherein the front faces of the first and second plate portions define an obtuse angle, and wherein the rear faces of the first and second plate portions define an acute angle.

5. The pulley of claim 4 wherein the first plate portion extends at the angle of about 30 degrees relative to the second plate portion.

6. The pulley of claim 5 wherein the front faces of the first and second plate portions are oriented in a direction of intended rotation of the pulley.

7. The pulley of claim 1 wherein the first edge of each wing of the plurality of wings defines an arc and wherein the collective first edges of the plurality of wings generally define a generally cylindrical contact surface of the pulley along the length of each wing.

8. The pulley of claim 7 wherein the first edges of adjacent wings intersect a line that extends generally parallel to the axis of the first and second hubs.

9. The pulley of claim 1 wherein the gusset includes a first segment that extends along the first plate portion and a second segment that extends along the second plate portion, the first and second segments extending at an angle relative to one another.

10. The pulley of claim 9 wherein each gusset first segment has a first end and a second end, and wherein each gusset second segment has a first end and a second end, the first end of each first segment connected to a portion the first hub circumferential surface, the first end of each second segment connected to a portion of the second hub circumferential surface, and the second ends of each first and second segment connected to one another.

11. The pulley of claim 10 wherein the collective second ends of each gusset first and second segment define a diameter that is greater than a diameter defined by the circumferential surface of the first and second hubs.

12. The pulley of claim 1 wherein the first edge of each metal plate comprises an edge member configured to define a contact surface having a surface area greater than that of the first edge.

13. A pulley for a conveyor belt comprising:
spaced first and second hubs aligned along a common axis, each of the first and second hubs having a circumferential surface;
a plurality of V-shaped wings radially spaced about and connected to the circumferential surfaces of the first and second hubs; and
a gusset connected between a first surface of each wing and a second surface of an adjacent wing.

14. The pulley of claim 13 wherein each V-shaped wing comprises a metal plate having front and rear surfaces, the front and rear surfaces of the metal plate of each V-shaped wing being generally parallel to a radially extending line from each hub circumferential surface corresponding to each wing connection to the first and second hubs.

15. The pulley of claim 13 wherein each V-shaped wing comprises a metal plate having front and rear surfaces, the front and rear surfaces of the metal plate of each V-shaped wing extending at an angle of between about zero degrees to about 30 degrees in a direction of intended rotation of the pulley relative to a radially extending line from each hub circumferential surface corresponding to each wing connection to the first and second hubs.

16. The pulley of claim 13 wherein a first surface of each V-shaped wing defines an obtuse angle, and wherein a second surface of each V-shaped wing defines an acute angle.

17. The pulley of claim 13 wherein each V-shaped wing defines an angle of about 30 degrees.

18. The pulley of claim 16 wherein the first surface of each V-shaped wing faces in a direction of intended rotation of the pulley.

19. The pulley of claim 13 wherein each V-shaped wing comprises a first edge, the first edge of each wing defining an arc and wherein the collective first edges of the plurality of wings define a generally cylindrical contact surface of the pulley along a length of each wing.

20. The pulley of claim 19 wherein the first edges of adjacent wings intersect a line that extends generally parallel to the axis of the first and second hubs.

21. The pulley of claim 14 wherein the gusset includes a first segment that extends along a first plate portion and a second segment that extends along a second plate portion, the first and second segments extending at an angle relative to one another.

22. The pulley of claim 21 wherein each gusset first segment has a first end and a second end, and wherein each gusset second segment has a first end and a second end, the first end of each first segment connected to a portion the first hub circumferential surface, the first end of each second segment connected to a portion of the second hub circumferential surface, and the second ends of each first and second segment connected to one another.

23. The pulley of claim 22 wherein the collective second ends of each gusset first and second segment define a diameter that is greater than a diameter defined by the circumferential surface of the first and second hubs.

24. The pulley of claim 19 wherein the first edge of each metal plate comprises an edge member configured to define a contact surface having a surface area greater than that of the first edge.

25. A pulley having a length for supporting a conveyor belt having a width, the width of the conveyor belt extending along the length of the pulley, the pulley comprising:
spaced first and second hubs aligned along a common axis, each of the first and second hubs having a circumferential surface;
a plurality of wings radially spaced about and connected to the circumferential surfaces of the first and second hubs, each wing of the plurality of wings configured to define a contact surface radially spaced from the first and second hubs for contacting the conveyor belt, wherein the contact surface of a first wing of the plurality of wings overlaps with the contact surface of a second wing of the plurality of wings along the length of the pulley, the width of the conveyor belt thereby being supported by the first and second wings; and
a gusset connected between a first surface of each wing and a second surface of an adjacent wing.

* * * * *